US012789205B2

(12) United States Patent
Fischer et al.

(10) Patent No.: US 12,789,205 B2
(45) Date of Patent: Nov. 10, 2026

(54) BELL CUP, ROTARY ATOMIZER HAVING THE BELL CUP, PAINTING INSTALLATION AND CORRESPONDING PAINTING METHOD

(71) Applicant: Dürr Systems AG, Bietigheim-Bissingen (DE)

(72) Inventors: Andreas Fischer, Gemmrigheim (DE); Peter Marquardt, Steinheim a. d. Murr (DE); Hans-Jürgen Nolte, Besigheim (DE); Marijo Bandic, Möglingen (DE); Oliver Herrmann, Sachsenheim (DE)

( * ) Notice: Subject to any disclaimer, the term of this patent is extended or adjusted under 35 U.S.C. 154(b) by 229 days.

(21) Appl. No.: 18/697,494

(22) PCT Filed: Oct. 4, 2022

(86) PCT No.: PCT/EP2022/077498
§ 371 (c)(1),
(2) Date: Apr. 1, 2024

(87) PCT Pub. No.: WO2023/057407
PCT Pub. Date: Apr. 13, 2023

(65) Prior Publication Data

US 2024/0408629 A1 Dec. 12, 2024

(30) Foreign Application Priority Data

Oct. 5, 2021 (DE) ..................... 10 2021 125 820.0

(51) Int. Cl.
*B05B 3/10* (2006.01)
*B05B 5/04* (2006.01)

(52) U.S. Cl.
CPC .......... *B05B 5/0407* (2013.01); *B05B 3/1014* (2013.01); *B05B 3/1064* (2013.01)

(58) Field of Classification Search
CPC ... B05B 3/1007; B05B 3/1014; B05B 3/1064; B05B 3/1092; B05B 5/0407
See application file for complete search history.

(56) References Cited

U.S. PATENT DOCUMENTS 4,148,932 A 4/1979 Tada et al.
4,521,462 A 6/1985 Smythe
(Continued)

FOREIGN PATENT DOCUMENTS

DE 9319555 U1 4/1994
DE 102006057596 A1 6/2008
(Continued)

OTHER PUBLICATIONS

International Search Report and Written Opinion for PCT/EP2022/077498 mailed Dec. 12, 2022 (16 pages; with English translation).

*Primary Examiner* — Darren W Gorman
(74) *Attorney, Agent, or Firm* — Taft Stettinius & Hollister LLP; Thomas E. Bejin; John W. Carpenter

(57) ABSTRACT

The disclosure relates to a bell cup for a rotary atomizer for painting components, having the following features:
a hub for rotatably mounting the bell cup on the rotary atomizer, so that the bell cup is rotatable about an axis of rotation,
an annular circumferential spraying edge for spraying the paint in the form of a spray jet, and
a circumferential outer lateral surface which widens along the axis of rotation in the distal direction towards the spraying edge,
The disclosure provides that the outer lateral surface of the bell cup is divided into different sections, which are angled differently. Furthermore, the disclosure comprises a rotary atomizer with such a bell cup, a painting installation and a corresponding painting method.

6 Claims, 6 Drawing Sheets

(56) References Cited

U.S. PATENT DOCUMENTS

| | | | | |
|---|---|---|---|---|
| 4,919,333 | A * | 4/1990 | Weinstein | B05B 5/04 239/223 |
| 4,943,178 | A * | 7/1990 | Weinstein | B23B 31/1107 403/259 |
| 5,620,750 | A | 4/1997 | Minoura et al. | |
| 6,341,734 | B1 * | 1/2002 | Van Der Steur | B05B 3/1014 239/222 |
| 2009/0158998 | A1 | 6/2009 | Herre | |
| 2011/0000974 | A1 | 1/2011 | Nolte et al. | |
| 2012/0137968 | A1 | 6/2012 | Nolte et al. | |
| 2016/0236214 | A1 | 8/2016 | Yamasaki et al. | |
| 2019/0224699 | A1 | 7/2019 | Yamauchi | |
| 2021/0394206 | A1 * | 12/2021 | Perinet | B05B 15/555 |
| 2022/0219186 | A1 * | 7/2022 | Woodcox | B05B 15/25 |

FOREIGN PATENT DOCUMENTS

| | | | |
|---|---|---|---|
| DE | 202009011363 | U1 | 11/2009 |
| EP | 2018229 | B1 | 11/2009 |
| EP | 3056283 | B1 | 1/2018 |
| GB | 2250697 | A | 6/1992 |
| JP | H0994488 | A | 4/1997 |
| WO | 2011018169 | A1 | 2/2011 |

* cited by examiner

BELL CUP, ROTARY ATOMIZER HAVING THE BELL CUP, PAINTING INSTALLATION AND CORRESPONDING PAINTING METHOD

CROSS-REFERENCE TO RELATED APPLICATIONS

This application is a national stage of, and claims priority to, Patent Cooperation Treaty Application No. PCT/EP2022/077498, filed on Oct. 4, 2022, which application claims priority to German Application No. DE 10 2021 125 820.0, filed on Oct. 5, 2021, which applications are hereby incorporated herein by reference in their entireties.

TECHNICAL FIELD

The disclosure relates to a bell cup for a rotary atomizer for painting components (e.g. motor vehicle body components). Furthermore, the disclosure relates to a rotary atomizer with such a bell cup. Furthermore, the disclosure also comprises a painting installation with the rotary atomizer according to the disclosure. Finally, the disclosure also comprises a corresponding painting method.

BACKGROUND

In modern painting installations for painting motor vehicle body components, rotary atomizers are usually used as application devices, which drive a bell cup at high speed by means of a compressed air turbine, whereby the bell cup sprays off the paint to be applied. An example of such a bell cup is known from WO 2011/018169 A1. Here, the outer lateral surface of the bell cup is conically shaped and therefore has an angle of inclination to the axis of rotation of the bell cup which is substantially constant along the bell cup. The outer surface of the bell cup is therefore continuous with a uniform angle of inclination and is not subdivided into different outer surface sections.

Furthermore, it should be mentioned in the context of the disclosure that various application tasks have to be performed in the painting installations. For example, different coating agents have to be applied, such as filler, base coat and clear coat. Furthermore, different types of paint can be used, such as solvent-based paints on the one hand and water-based paints on the other. Finally, different types of components can be painted, such as vehicle bodies on the one hand and add-on parts (e.g. bumpers) on the other. These different application tasks usually require different, specifically adapted rotary atomizers with corresponding bell cups. The variety of different bell cups required is logistically complex and also entails a high development outlay. In addition, the various application tasks are also performed in different painting booths arranged one behind the other along a painting line, which increases the cost of building and operating a painting installation.

DETAILED DESCRIPTION

Figure 1:
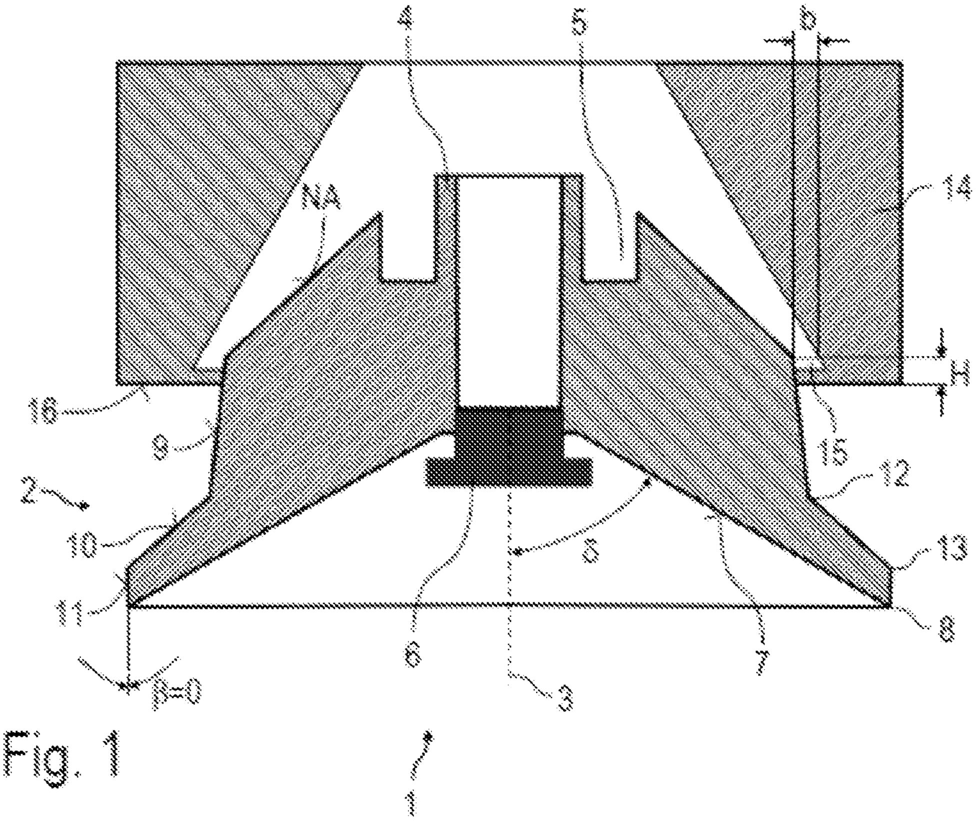
FIG. 1 shows a schematic cross-sectional view of a rotary atomizer according to the disclosure.

The disclosure is based on the task of creating a correspondingly improved bell cup, an associated rotary atomizer and a corresponding painting installation. Furthermore, the disclosure is based on the task of specifying a corresponding painting method.

It should be mentioned at the outset that the structural design of the bell cup according to the disclosure described below preferably allows the bell cup to be used for a wide variety of application tasks, such as, for example, for painting motor vehicle bodies on the one hand and for painting add-on parts on the other. The various possible application tasks will be described in detail later.

First of all, the bell cup according to the disclosure comprises a mounting interface (e.g. hub) in accordance with the known bell cup described at the beginning, in order to be able to mount the bell cup on a rotary atomizer, so that the bell cup can be rotated about an axis of rotation. For example, the bell cup can be screwed with its mounting interface (e.g. hub) onto a hollow turbine shaft of a compressed air turbine in the rotary atomizer for this purpose. However, the disclosure is not limited to such a screw connection with regard to the mechanical connection between the bell cup on the one hand and the rotary atomizer on the other hand.

In addition, the bell cup according to the disclosure also has, in accordance with the bell cups described at the beginning, an annular circumferential spraying edge for spraying off the paint to be applied in the form of a spray jet.

Furthermore, the bell cup according to the disclosure also has a circumferential outer lateral surface which widens along the axis of rotation in the distal direction towards the spraying edge.

The bell cup according to the disclosure is characterized by the design of this outer surface. In the case of the known bell cup described at the beginning according to WO 2011/018169 A1, this outer lateral surface is namely uniform and has an essentially constant angle of inclination to the axis of rotation of the bell cup. Thus, the outer lateral surface of the bell cup is not divided into different lateral surface sections in the known bell cup. The bell cup according to the disclosure is such that the outer lateral surface of the bell cup is divided along the axis of rotation into several lateral surface sections, namely a middle lateral surface section and a distal lateral surface section. The middle lateral surface section is conically shaped, as is also the case with the known bell cup described at the beginning. The distal lateral surface section of the bell cup, on the other hand, can be either conical or cylindrical in shape in the bell cup according to the disclosure. The various lateral surface sections of the outer lateral surface of the bell cup differ in their angle of inclination to the axis of rotation of the bell cup. For example, the conical middle lateral surface section has a first angle of inclination to the axis of rotation that is preferably greater than the second angle of inclination of the distal lateral surface section. Thus, the proximal lateral surface section is more angled to the axis of rotation than the distal lateral surface section.

In addition, the bell cup according to the disclosure may have a further proximal lateral surface section in its lateral surface, which is angled differently relative to the axis of rotation of the bell cup than the middle lateral surface section. In a preferred embodiment of the disclosure, the outer lateral surface of the bell cup thus has at least three lateral surface sections which follow one another along the axis of rotation of the bell cup and can be directly adjacent to one another, namely first a proximal lateral surface section, followed by a middle lateral surface section and finally a distal lateral surface section.

Preferably, the outer lateral surface of the bell cup even has at least four different lateral surface sections which follow one another along the axis of rotation of the bell cup and can be directly adjacent to one another, namely first a hub-side, so-called hub section, then the proximal lateral surface section, followed by the middle lateral surface section and finally the distal lateral surface section. It should be mentioned here that the hub section is preferably more angled to the axis of rotation than the adjacent proximal lateral surface section.

The distal lateral surface section of the outer lateral surface of the bell cup preferably borders directly on the spraying edge of the bell cup, i.e. the distal lateral surface section preferably merges directly into the spraying edge.

The middle lateral surface section of the outer lateral surface of the bell cup, on the other hand, preferably borders directly on the distal lateral surface section, in particular with a kink between the distal lateral surface section and the middle lateral surface section. The kink is caused by the different angles of inclination of the middle lateral surface section on the one hand and the distal lateral surface section on the other.

The proximal lateral surface section of the outer lateral surface of the bell cup, on the other hand, is preferably directly adjacent to the middle lateral surface section, in particular with a kink between the proximal lateral surface section on the one hand and the middle lateral surface section on the other. This kink is also caused by the different angles of inclination of the proximal lateral surface section on the one hand and the middle lateral surface section on the other.

In addition, the proximal lateral surface section of the outer lateral surface of the bell cup is preferably directly adjacent to the so-called hub section, in particular with a kink between the proximal lateral surface section on the one hand and the hub section on the other. This kink is also caused by the different angles of inclination of the proximal lateral surface section on the one hand and the hub section on the other. Thus, the hub section of the outer lateral surface of the bell cup is preferably more angled to the axis of rotation of the bell cup than the proximal lateral surface section.

In the preferred embodiment of the disclosure, the first angle of inclination of the middle lateral surface section relative to the axis of rotation of the bell cup is preferably in the range of 25°-45° or 27°-30°, whereby an angle of inclination of 30° has proven to be particularly advantageous.

The second angle of inclination of the distal lateral surface section, on the other hand, is preferably in the range of 0°-10° or 0°-5° relative to the axis of rotation of the bell cup, an angle of inclination of 0° having proved to be particularly advantageous. The distal lateral surface section of the outer lateral surface of the bell cup thus preferably runs parallel to the axis of rotation of the bell cup.

In the preferred embodiment of the disclosure, the middle lateral surface section preferably has an axial length along the axis of rotation of the bell cup which is in the range of 0 mm-10 mm or 1 mm-5 mm.

The distal lateral surface section of the outer lateral surface of the bell cup, on the other hand, preferably has an axial length along the axis of rotation of the bell cup which is in the range of 0 mm-2 mm.

Furthermore, it should be mentioned that the bell cup according to the disclosure also preferably has a centrally arranged paint feed in order to feed the paint to be applied, as is known per se from the prior art. For example, the bell cup can be mounted with its hub on a hollow turbine shaft of the rotary atomizer, with a paint nozzle projecting axially through the turbine shaft up to the bell cup and centrally feeding the paint to be applied, as is known from the prior art. In addition, the bell cup according to the disclosure can also have a frontal overflow surface which leads to the spraying edge, so that during operation the paint to be applied flows out of the central paint feed via the overflow surface outward to the spraying edge of the bell cup.

In the bell cup according to the disclosure, this overflow surface preferably widens conically along the axis of rotation in the spraying direction. In this case, the overflow surface can have a substantially constant angle of inclination relative to the axis of rotation of the bell cup, i.e. the overflow surface is preferably not divided into a plurality of sections which have different angles of inclination. For example, the angle of inclination of the overflow surface relative to the axis of rotation of the bell cup can be in the range of 50°-87° or 55°-85°, whereby an angle of inclination of the overflow surface of 60° has proven to be particularly advantageous.

Furthermore, it should be mentioned that the overflow surface of the bell cup preferably includes a certain angle of inclination relative to the middle or distal lateral surface section of the outer lateral surface of the bell cup, this angle of inclination preferably being in the range of 10°-50° or 20°-40°, a value of 30° having proved to be particularly advantageous.

The rotary atomizer according to the disclosure may in this case have a shaping air ring which has the task of shaping the spray jet emitted by the bell cup, as is known per se from the prior art. The shaping air ring annularly surrounds the bell cup at its proximal end and is designed to emit at least one shaping air jet from behind onto the outer surface of the bell cup and/or onto the spray jet of paint in order to shape the spray jet.

The proximal lateral surface section and/or the hub section of the outer lateral surface of the bell cup can here be arranged completely or partially inside the shaping air ring in the axial direction, i.e. the bell cup is at least partially enclosed (encapsulated) with its proximal lateral surface section. The middle lateral surface section of the lateral surface of the bell cup, on the other hand, is preferably located completely outside the shaping air ring in the axial direction, which preferably also applies to the distal lateral surface section of the bell cup.

Furthermore, it should be mentioned that the outer lateral surface of the bell cup with the shaping air ring preferably encloses an annular gap, preferably in the region of the middle and/or the proximal lateral surface section of the bell cup. At its narrowest point, this annular gap preferably has a gap width that is smaller than 10 mm, 5 mm, 4 mm, 3 mm or 2 mm. The narrowest point of the annular gap between the outer shaping air ring on the one hand and the outer circumferential surface of the bell cup on the other hand is here preferably at a certain axial distance from the end face of the shaping air ring, this axial distance preferably being smaller than 10 mm, 7 mm or 5 mm. It should also be mentioned that the annular gap between the outer circumferential surface of the bell cup on the one hand and the shaping air ring on the other hand preferably widens from the narrowest point both in the proximal direction and in the distal direction, which has proved advantageous.

In the preferred embodiment of the disclosure, the shaping air ring has a first shaping air nozzle ring which is preferably aligned coaxially with the axis of rotation of the bell cup and has a plurality of shaping air nozzles which can each emit a first shaping air jet. The shaping air nozzles are here arranged in the first shaping air nozzle ring preferably equidistantly distributed over the circumference of the shaping air nozzle ring. Furthermore, it should be mentioned that the first shaping air nozzles deliver the first shaping air jet preferably angled at a first swirl angle in the circumferential direction. This means that the first shaping air jet is not aligned parallel to the axis of rotation of the bell cup, but is angled in the circumferential direction.

In addition, in the rotary atomizer according to the disclosure, the shaping air ring can have a second shaping air nozzle ring which is also preferably aligned coaxially with the axis of rotation of the bell cup and generally comprises a plurality of shaping air nozzles which can be arranged equidistantly distributed over the circumference of the second shaping air nozzle ring and each output a second shaping air jet. The shaping air nozzles of the second shaping air nozzle ring can optionally be aligned axially, i.e. parallel to the rotational axis of the bell cup, or angled in the circumferential direction, i.e. twisted.

The first swirl angle of the circumferentially angled shaping air nozzles of the first shaping air nozzle ring is preferably in the range of 40°-75° or 50°-64°, with a swirl angle of 55° proving particularly advantageous. It should be mentioned here that the shaping air nozzles angled in the circumferential direction are preferably oriented counter to the direction of rotation of the bell cup.

Furthermore, it should be mentioned that the first shaping air nozzle ring preferably has a smaller diameter than the bell cup at its spraying edge, whereby the difference in diameter can be in the range of 2 mm-8 mm or 3 mm-6 mm, for example.

It should also be mentioned that there may be an axial distance between the end face of the shaping air ring on the one hand and the spraying edge of the bell cup on the other, which may be in the range of 2 mm-40 mm or 5 mm-30 mm, with a distance of 15 mm proving particularly advantageous.

It should also be noted that the diameter of the second shaping air nozzle ring is preferably essentially equal to the outer diameter of the spraying edge of the bell cup, for example with a deviation of at most ±2 mm or with an oversize of +1 mm.

It should be mentioned that the individual shaping air nozzles of the first and second shaping air nozzle rings can each have a countersink at their outlet opening, which can be cylindrical or conical in shape, for example. The maximum diameter of the countersink of the shaping air nozzles is preferably larger than the bore diameter of the shaping air nozzles, preferably by 20-70% or 30-50%. It should be mentioned here that the countersink can extend along the bore axis over a countersink length in the axial direction which is substantially equal to the bore diameter, for example with a deviation of at most ±40%, ±30% or ±45%.

In practice, countersinks are used. These are usually used to deburr holes or for countersinking the head of wood screws (i.e. taper countersinks). Usually the countersinks have a 90° angle. However, the angle could also be 60° or 120°. Alternatively, there are also flat countersinks. These are used to countersink screw heads (hexagonal screws, Allen screws). The decisive factor is that the air-flow distribution changes if the bore is not sharp-edged but countersunk. Small changes have large effects. Countersinks can be measured in diameter and or countersink depth. The angle is also required, but is then given by the selected tool.

The spraying edge of the bell cup is preferably located in a spraying edge plane which runs at right angles to the axis of rotation of the bell cup, as is also the case with known bell cups. The shaping air jet intersects the spraying edge plane of the bell cup at a point which is spaced from the spraying edge of the bell cup, preferably at a distance of 0 mm-4 mm. The air jet is therefore preferably not directed at the outer surface of the bell cup, but passes the outer surface of the bell cup with its center axis. This preferably applies to both the first shaping air and the second shaping air.

The painting installation according to the disclosure has a painting zone, which can be arranged, for example, in a painting booth. In addition, the painting installation according to the disclosure has a painting line for conveying the components to be painted (e.g. motor vehicle body components) through the painting zone.

The painting installation according to the disclosure is characterized by the fact that various application tasks are performed in the same painting zone.

For example, the following application tasks can be performed in the same painting zone:

- Application of a first base coat layer (BC1) to outer surfaces of the components,
- application of a first base coat layer (BC1) to inner surfaces of the components, and
- applying a second base coat layer (BC2) onto the first base coat layer on the outer surfaces of the components (BC: base coat).

Furthermore, within the scope of the disclosure, it is also possible for the following application tasks to be performed in the same painting zone:

- Painting of motor vehicle bodies and
- painting of add-on parts for the motor vehicle bodies.

Furthermore, within the scope of the disclosure, it is also possible for the following application tasks to be performed in the same painting zone using the same rotary atomizer:

- Application of a filler layer to the components,
- application of a first base coat layer (BC1) onto the filler layer on the components,
- applying a second base coat layer (BC2) onto the first base coat layer on the components, and
- applying a clear coat layer onto the second base coat layer on the components.

Finally, the disclosure also comprises a corresponding painting method, whereby the individual method steps of the painting method according to the disclosure are already apparent from the above description, so that a separate description of the individual method steps can be dispensed with.

With regard to the above description of the disclosure, it should be mentioned that the concrete numerical values mentioned do not necessarily have to be adhered to exactly. If, for example, a certain numerical value is mentioned, the disclosure can also have deviations from the mentioned numerical value in the concrete technical realization, for example in the range of ±30%, ±20%, ±10% or ±5%.

Other advantageous further embodiments of the disclosure are indicated in the dependent claims or are explained in more detail below together with the description of the preferred embodiment examples with reference to the figures.

In the following, the embodiment of a rotary atomizer 1 according to the disclosure shown in FIG. 1 will be described, whereby the construction and the mode of operation of the rotary atomizer 1 are basically known from the prior art.

Thus, in accordance with the state of the art, the rotary atomizer 1 has a bell cup 2 which is rotatable about an axis of rotation 3 and is driven in operation by a compressed-air turbine of the rotary atomizer 1, the compressed-air turbine not being shown for simplification.

For mounting on the rotary atomizer 1, the bell cup 2 has a hub 4 with which the bell cup 1 can be screwed, for example, onto a hollow turbine shaft of the compressed air turbine of the rotary atomizer 1.

The bell cup 2 here has an outer rinsing chamber 5 in order to be able to rinse the outer lateral surface of the bell cup 2 with a rinsing agent, as is known per se from WO 2011/018169 A1, so that the outer rinsing chamber 5 is shown here only schematically.

The paint to be applied is fed here centrally through the hollow hub 4, for example through a paint nozzle which runs coaxially within the hollow turbine shaft of the compressed air turbine.

The paint to be applied then first impinges axially on a distributor disc 6, shown here only schematically, and is thus deflected radially outward. The paint then flows from the distributor disc 6 over an overflow surface 7 to an annular spraying edge 8, where the paint is sprayed off, as is known from the prior art.

The outer lateral surface of the bell cup 2 mentioned above is divided into several lateral surface sections, namely a hub section NA in the area of the hub 4, a proximal lateral surface section 9, a middle lateral surface section 10 and a distal lateral surface section 11, which directly follow one another along the axis of rotation 3 of the bell cup 2 and directly adjoin one another.

The hub section NA merges with a kink into the proximal lateral surface section 9. Here, the proximal lateral surface section 9 merges with a kink 12 into the middle lateral surface section 10. The middle lateral surface section 10 in turn merges with a kink 13 into the distal lateral surface section 11.

The hub section NA, the proximal lateral surface section 9, the middle lateral surface section 10 and the distal lateral surface section 11 of the outer lateral surface of the bell cup 2 differ here in their angles of inclination, on the one hand with respect to the axis of rotation 3 and on the other hand with respect to the overflow surface 7 of the bell cup 2.

Figure 2:
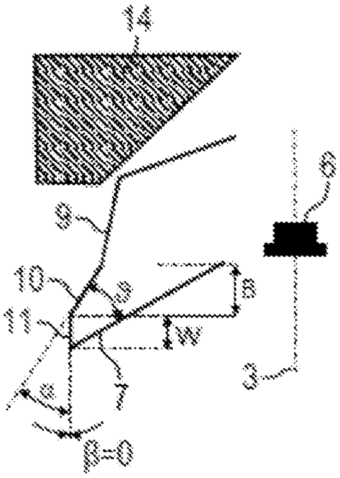
FIGS. 2-4 show enlarged schematic cross-sectional views of the bell cup in different variants of the disclosure.
Figure 3:
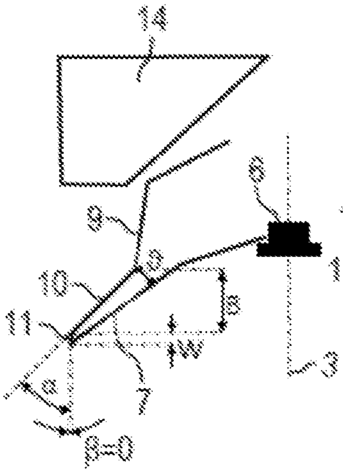
Figure 4:
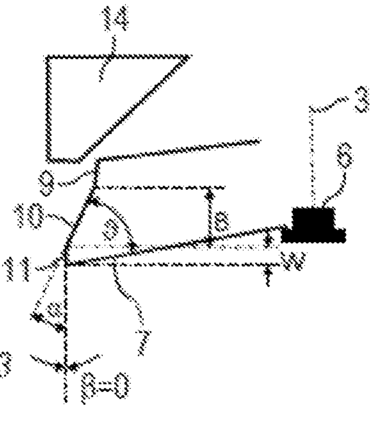

FIGS. 2-4 show different variants of the disclosure with different angles of inclination of the various lateral surface sections 9-11 of the outer lateral surface of the bell cup 2.

First of all, it should be noted that the distal lateral surface section 11 of the outer lateral surface of the bell cup 2 is aligned parallel to the axis of rotation 3 of the bell cup 2 and thus has an angle of inclination $\beta=0°$. However, within the scope of the disclosure, other angles of inclination $\beta$ of the distal lateral surface section 11 are also possible, which may, for example, be in the range of 0°-5°.

The middle lateral surface section 10, on the other hand, has an angle of inclination $\alpha$ to the axis of rotation 3 of the bell cup 2 which can be in the range of 25°-45°, a value of $\alpha=30°$ having proved particularly advantageous.

The proximal lateral surface section 9, on the other hand, has an angle of inclination to the axis of rotation 3 that is smaller than the angle of inclination $\alpha$ of the middle lateral surface section 10.

Furthermore, it should be mentioned that the middle lateral surface section 10 includes with the overflow surface 7 an angle of inclination $\theta$ which may, for example, be in the range of 10°-50° and is preferably $\theta=30°$.

On the other hand, the overflow surface 7 encloses with the axis of rotation 3 an angle $\delta$ which can preferably be in the range of 55°-85°.

Furthermore, it should be mentioned that the distal lateral surface section 11 of the outer lateral surface of the bell cup 2 extends over a certain axial length W along the axis of rotation 3 of the bell cup 2, this axial length W preferably being in the range of 0-2 mm.

The middle lateral surface section 10, on the other hand, has an axial length B along the axis of rotation 3 of the bell cup 2, which is preferably in the range of 1 mm-5 mm. The axial length B of the middle lateral surface section 10 is thus preferably significantly greater than the axial length W of the distal lateral surface section 11 of the outer lateral surface of the bell cup 2.

It is further apparent from the drawings that the rotary atomizer 1 has a shaping air ring 14 which has the task of shaping the spray jet emitted from the bell cup 2, as is known per se from the prior art.

The shaping air ring 14 surrounds the bell cup 2 in an annular shape and encloses an annular gap 15 with the bell cup 2. The annular gap 15 has a gap width b at its narrowest point which is preferably less than 2 mm. The narrowest point of the annular gap 15 is spaced from the end face 16 of the shaping air ring 14 by a distance H which is preferably less than 5 mm.

Figure 5:
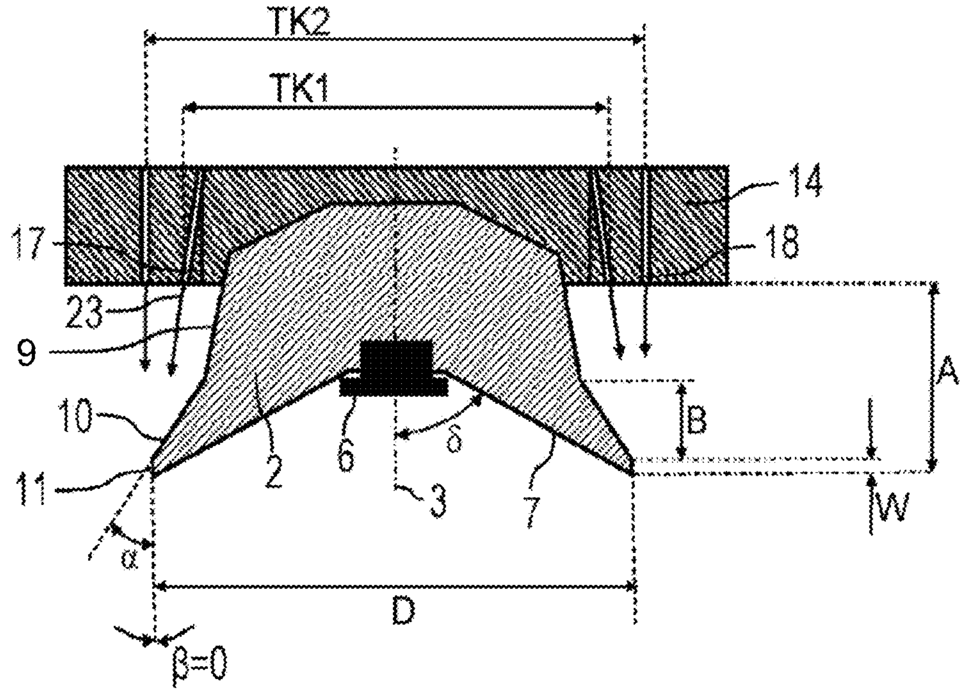
FIG. 5 shows a modification of the rotary atomizer according to FIG. 1.

FIG. 5 shows a modification of FIG. 1, so that in order to avoid repetition, reference is first made to the description of FIG. 1, the same reference signs being used for corresponding details.

From this drawing it can be seen that the shaping air ring 14 has two shaping air nozzle rings with different diameters TK1, TK2. The first shaping air nozzle ring here has shaping air nozzles 17 which are twisted in the circumferential direction, i.e. the first shaping air nozzles 17 do not run parallel to the axis of rotation 3 of the bell cup 2, but are angled in the circumferential direction. The second shaping air nozzle ring, on the other hand, has shaping air nozzles 18 which are aligned parallel to the axis of rotation 3 of the bell cup 2.

Figure 6:
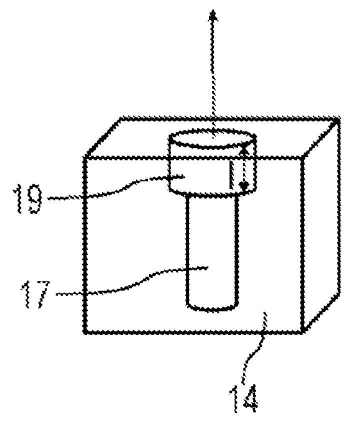
FIGS. 6 and 7 show schematic perspective views to illustrate the countersinking of the shaping air nozzles.

FIG. 6 shows a schematic simplified representation of the shaping air nozzles 17, which can have a countersink 19 at their outlet opening, which in this embodiment is cylindrical in shape and has a countersink length l which can be in the range of 30%-50% in relation to the diameter of the shaping air nozzle 17.

Figure 7:
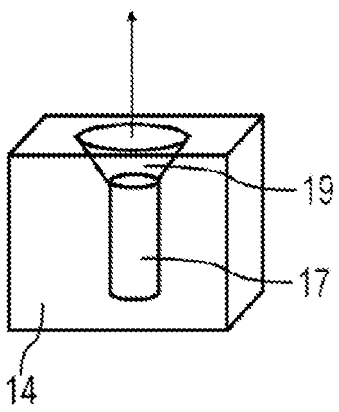

FIG. 7 shows a variation of FIG. 6 with the special feature that the countersink 19 is not cylindrical but comically shaped.

The countersink 19 is shown here only in relation to the shaping air nozzle 17. However, the shaping air nozzles 18 can have such a countersink 19 in the same way.

Figure 8:
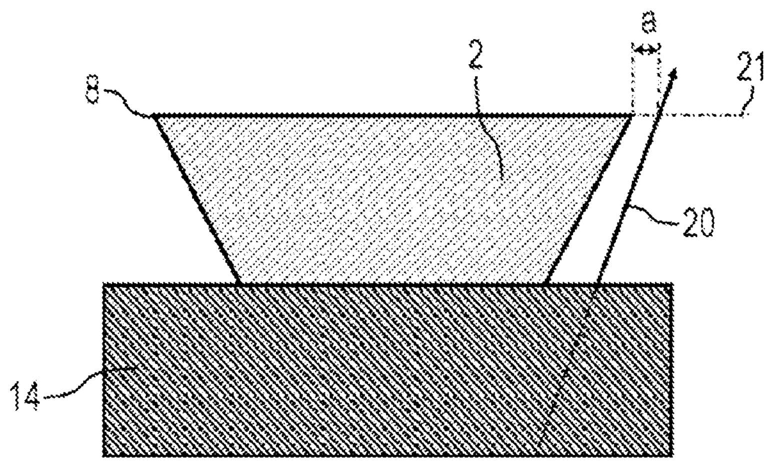
FIG. 8 shows a schematic side view of a rotary atomizer according to the disclosure to illustrate the orientation of a shaping air jet.

FIG. 8 shows a schematic illustration to clarify the orientation of a shaping air jet 20. Here, the spraying edge 8 of the bell cup 2 runs in a spraying edge plane 21 which is intersected by the shaping air jet 20 radially outside the spraying edge 8 of the bell cup 2, namely at a distance a which can be in the range of 0 mm-4 mm.

Figure 9:
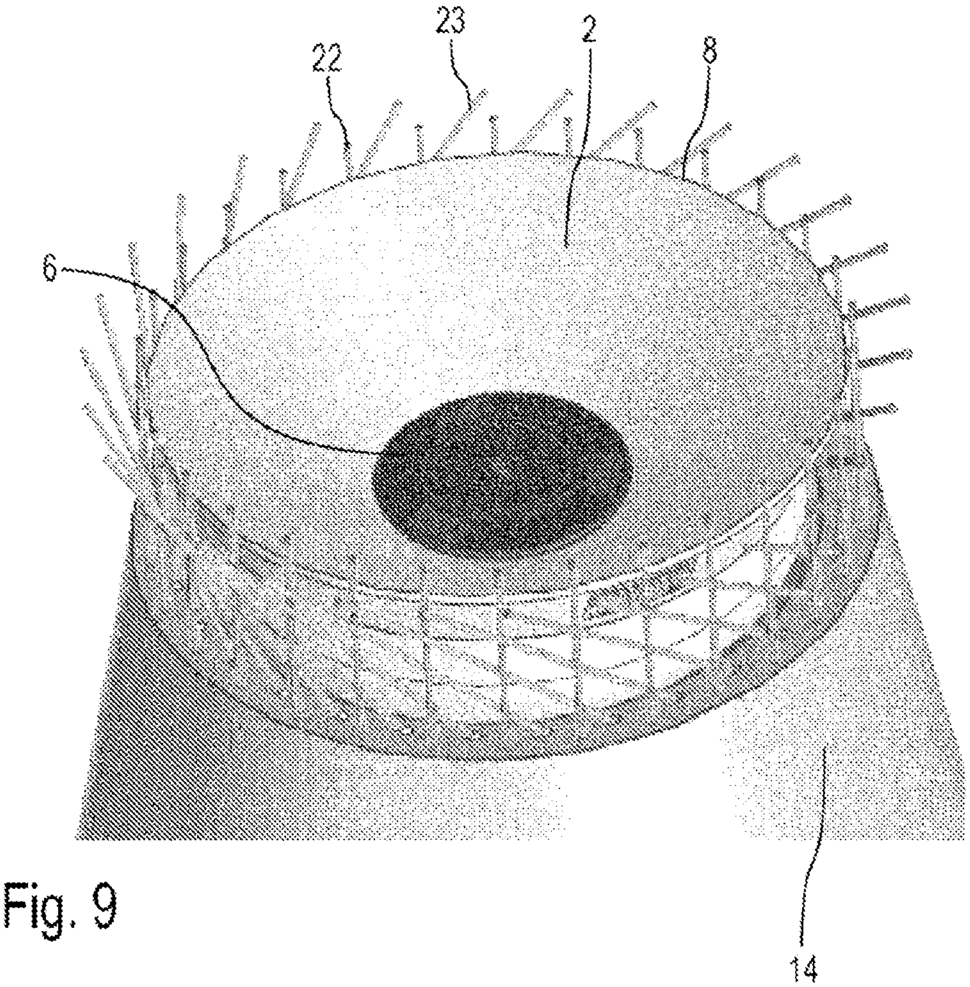
FIG. 9 shows a perspective view of a rotary atomizer according to the disclosure to illustrate the alignment of the various air jets.

FIG. 9 shows a perspective view of a rotary atomizer 1 according to the disclosure, which largely corresponds to the embodiments described above, so that to avoid repetition reference is made to the above description, the same reference signs being used for corresponding details.

Here it can be seen that the two shaping air nozzle rings emit two different shaping air jets 22, 23, the shaping air jet 22 being aligned axially, i.e. parallel to the axis of rotation 3 of the bell cup 2, whereas the shaping air jet 23 is angled in the circumferential direction and thus has a twist.

Figure 10:
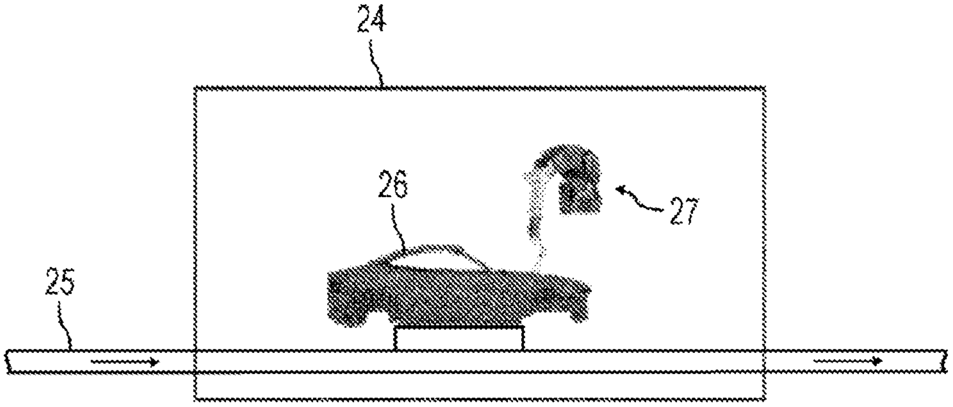
FIG. 10 shows a simplified schematic representation of a painting installation according to the disclosure.

FIG. 10 shows a highly simplified schematic representation of a painting installation according to the disclosure with a painting booth 24, wherein a painting line 25 runs through the painting booth 24 in order to convey motor vehicle bodies 26 into the painting booth 24 or out of the painting booth 24.

A painting robot 27 is arranged in the painting booth 24, which is equipped with the rotary atomizer 1 according to the disclosure and is therefore able to perform various application tasks in the same painting booth 24. For example, in addition to the motor vehicle bodies 25, add-on parts can also be painted in the painting booth 24, to name just one example of various application tasks.

Figure 11:
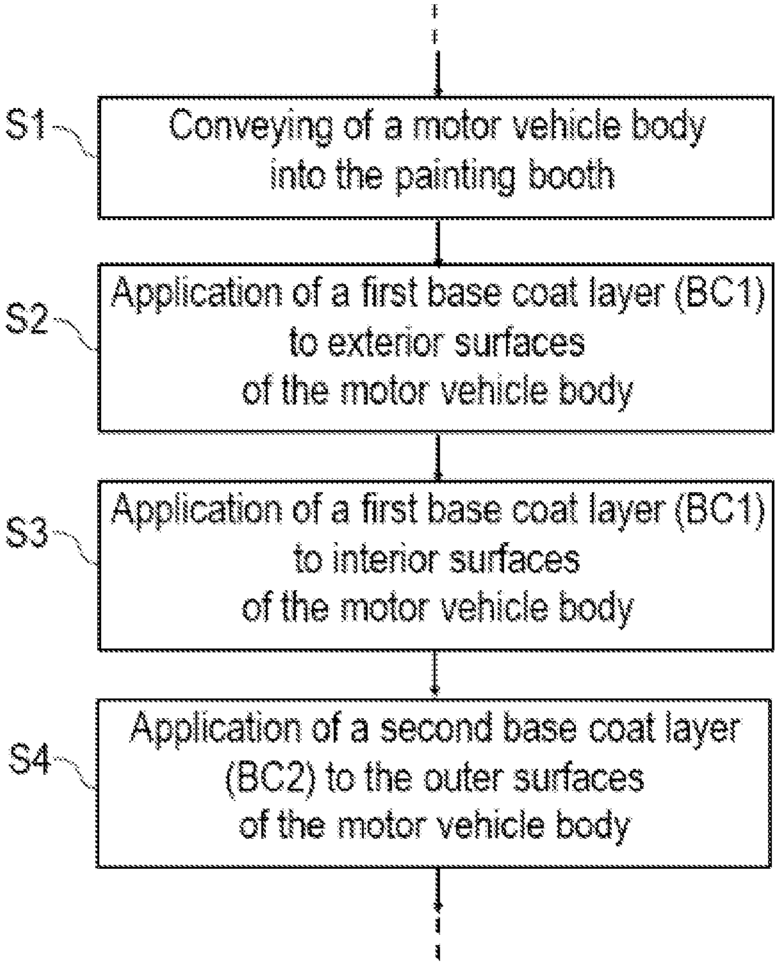
FIG. 11 shows a flow chart illustrating one variant of the painting method according to the disclosure.

FIG. 11 shows a flow diagram to illustrate the painting method according to one variant of the disclosure.

In a first step S1, motor vehicle bodies are first conveyed into the painting booth.

In the next step S2, a first base coat (BC1) is then applied to the outer surfaces of the motor vehicle body.

In a further step S3, a first base coat (BC1) is then applied to the inner surfaces of the vehicle body in the same painting booth.

In a further step S4, a second base coat (BC2) is then applied to the outer surfaces of the motor vehicle body.

It should be mentioned here that the various application tasks can be performed in the same painting booth, which is advantageous, as would be described at the beginning.

Figure 12:
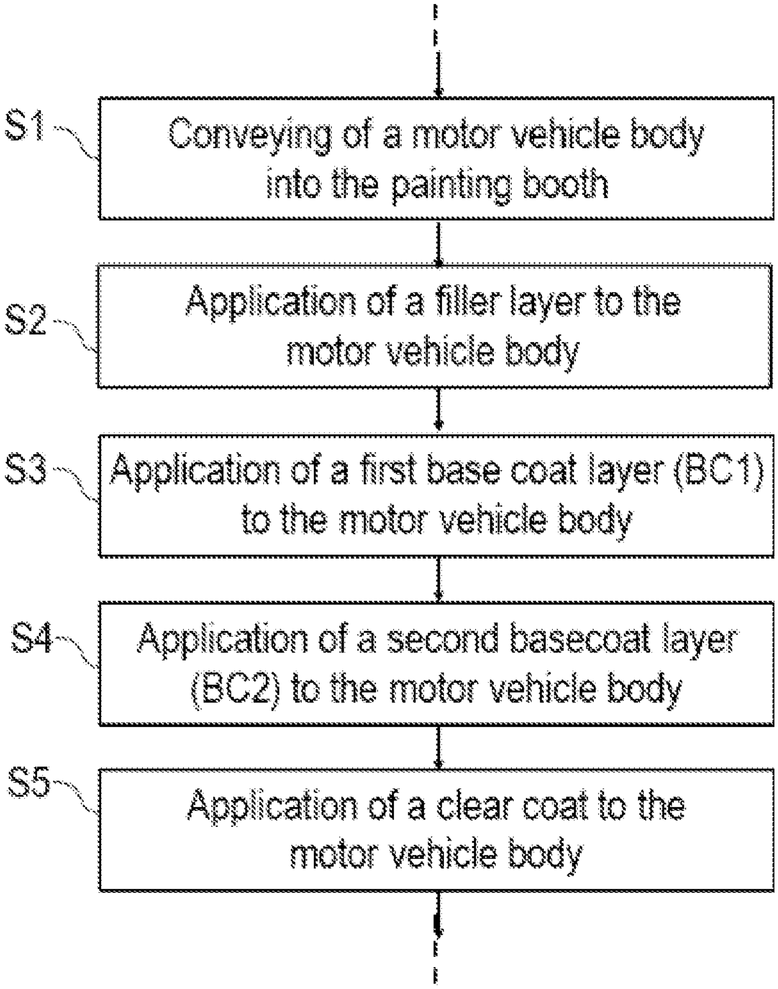
FIG. 12 shows a flow chart illustrating another variant of the painting method according to the disclosure.

FIG. 12 shows a further flow diagram to illustrate another variant of the painting method according to the disclosure.

In a first step S1, the motor vehicle bodies are again conveyed into the painting booth.

In the next step S2, a filler layer is then applied to the motor vehicle body in the painting booth.

A further step S3 then involves applying a first base coat layer (BC1) to the motor vehicle body in the same spray booth.

In the next step S4, a second base coat layer (BC2) can then be applied to the motor vehicle body in the same painting booth.

Finally, in a next step S5, a clear coat layer can be applied to the motor vehicle body, which can also be done in the same painting booth.

The invention claimed is:

1. A bell cup for a rotary atomizer for painting components, having a) a mounting interface adapted for mounting the bell cup on the rotary atomizer, b) an annular spraying edge encircling an axis of rotation for spraying off the paint in the form of a spray jet, and c) a circumferential outer lateral surface which widens along the axis of rotation in the distal direction towards the spraying edge, wherein d) the lateral surface of the bell cup has a hub section, a proximal lateral surface section, a middle lateral surface section and a distal lateral surface section along the axis of rotation, wherein the hub section is proximally adjacent to and merges with a kink into the proximal lateral surface section, and the hub section is angled differently relative to the axis of rotation than the proximal lateral surface section and the distal lateral surface section, e) the middle lateral surface section is conical, f) the conical middle lateral surface section is angled at a first angle of inclination relative to the axis of rotation of the bell cup, wherein the proximal lateral surface section is angled at a proximal angle of inclination relative to the axis of rotation that is less than the first angle of inclination, g) the distal lateral surface section is conical or cylindrical, h) the distal lateral surface section is angled at a second angle of inclination to the axis of rotation of the bell cup, and i) the first angle of inclination is greater than the second angle of inclination, j) wherein the hub section has a greater axial length along the axis of rotation than the distal lateral surface section, is conically shaped with a uniform cone angle, and is directly adjacent to an external rinsing chamber at the rear side of the bell cup.

2. The bell cup according to claim 1, wherein a) the distal lateral surface section directly adjoins the spraying edge, and b) the middle lateral surface section directly adjoins the distal lateral surface section with a kink between the distal lateral surface section and the middle lateral surface section, and c) the proximal lateral surface section directly adjoins the middle lateral surface section with a kink between the proximal lateral surface section and the middle lateral surface section.

3. The bell cup according to claim 1, wherein a) the first angle of inclination of the middle lateral surface section is in the range of 25°-45°, and b) the second angle of inclination of the distal lateral surface section is in the range of 0°-10°.

4. The bell cup according to claim 1, wherein a) the middle lateral surface section has a length in axial direction along the axis of rotation which is in the range of 0.5 mm-10 mm, and b) the distal lateral surface section has a length in the axial direction along the axis of rotation which is in the range of 0-2 mm.

5. The bell cup according to claim 1, further comprising a) a centrally arranged paint feed for feeding the paint to be applied, and b) a frontal overflow surface leading to the spraying edge, so that in operation the paint to be applied flows out of the paint feed via the overflow surface outwards to the spraying edge.

6. The bell cup according to claim 5, wherein a) the overflow surface widens conically along the axis of rotation in the spraying direction, a) and b) the overflow surface is angled at a substantially constant angle of inclination to the axis of rotation of the bell cup, and c) the angle of inclination of the overflow surface is in the range of 50°-87°, and d) the overflow surface encloses with the middle lateral surface section and/or with the distal lateral surface section of the outer lateral surface of the bell cup an angle which lies in the range of 10°-50°.

* * * * *